(12) United States Patent
Sorimoto (10) Patent No.: US 8,926,316 B2
(45) Date of Patent: Jan. 6, 2015

(54) UNDERCUT PROCESSING MECHANISM

(75) Inventor: Masanori Sorimoto, Hiroshima (JP)

(73) Assignee: Technocrats Corporation, Hiroshima (JP)

( * ) Notice: Subject to any disclaimer, the term of this patent is extended or adjusted under 35 U.S.C. 154(b) by 0 days.

(21) Appl. No.: 14/117,725

(22) PCT Filed: Jan. 11, 2012

(86) PCT No.: PCT/JP2012/050359
§ 371 (c)(1),
(2), (4) Date: Nov. 14, 2013

(87) PCT Pub. No.: WO2013/014952
PCT Pub. Date: Jan. 31, 2013

(65) Prior Publication Data
US 2014/0141115 A1    May 22, 2014

(30) Foreign Application Priority Data
Jul. 22, 2011    (JP) .................................. 2011-160937

(51) Int. Cl.
| | | |
|---|---|---|
| B29C 33/44 | (2006.01) | |
| B29C 45/44 | (2006.01) | |
| B29C 33/48 | (2006.01) | |
| B22D 17/22 | (2006.01) | |
| B22D 17/24 | (2006.01) | |

(52) U.S. Cl.
CPC ............. *B29C 33/44* (2013.01); *B29C 45/4471* (2013.01); *B29C 33/485* (2013.01); *B22D 17/2236* (2013.01); *B22D 17/24* (2013.01); *B29C 45/4435* (2013.01); *Y10S 425/058* (2013.01)

USPC ........ 425/556; 425/190; 425/192 R; 425/438; 425/441; 425/443; 425/444; 425/DIG. 58; 425/191; 249/66.1; 249/180

(58) Field of Classification Search
CPC   B29C 45/44; B29C 45/4435; B29C 45/4471; B29C 45/401; B29C 33/44; B29C 33/485; B29C 45/40; B29C 45/4005; B29C 33/442; B29C 17/24
USPC ......... 425/556, 577, 190, 351, 438, 441, 442, 425/444, DIG. 58, 191, 192 R, 443; 249/66.1, 180, 185
See application file for complete search history.

(56) References Cited

U.S. PATENT DOCUMENTS 5,137,442 A * 8/1992 Starkey .......................... 425/438
5,281,127 A * 1/1994 Ramsey ......................... 425/556
(Continued)

FOREIGN PATENT DOCUMENTS

| JP | 51-049250 A | 4/1976 |
|---|---|---|
| JP | 63-070316 U | 5/1988 |

(Continued)

*Primary Examiner* — Seyed Masoud Malekzadeh
(74) *Attorney, Agent, or Firm* — Kubotera & Associates, LLC (57) ABSTRACT

A pair of mold cores (51, 52) for molding an undercut portion (P1) in a holder (30) installed inside a movable mold (13) are connected to and supported by a retaining piece (40) which is moved in the demolding direction, and at the time of demolding, the respective mold cores (51, 52) are guided by guide means (33, 34) from the molding position, where they are contacted with each other, to the mold release position, where they are separated from each other, being moved from one end side to the other end side of the retaining piece (40), in the mutually opposite directions so as to pass each other in the back and forth direction.

6 Claims, 9 Drawing Sheets

(56) References Cited

U.S. PATENT DOCUMENTS

| | | | |
|---|---|---|---|
| 5,316,467 A * | 5/1994 | Starkey | 425/438 |
| 5,540,582 A * | 7/1996 | Catalanotti et al. | 425/577 |
| 5,773,048 A * | 6/1998 | Ramsey | 425/556 |
| 6,039,558 A * | 3/2000 | Park et al. | 425/556 |
| 6,474,977 B1 * | 11/2002 | Wimmer | 425/556 |
| 6,491,513 B1 * | 12/2002 | Schneider | 425/577 |
| 6,537,053 B1 * | 3/2003 | Watkins | 425/190 |
| 2010/0247701 A1 * | 9/2010 | Sorimoto | 425/236 |
| 2011/0020490 A1 * | 1/2011 | Starkey et al. | 425/556 |

FOREIGN PATENT DOCUMENTS

| | | |
|---|---|---|
| JP | 63-132722 U | 8/1988 |
| JP | 02-124113 U | 10/1990 |
| JP | 11-105085 A | 4/1999 |
| JP | 2001-129857 A | 5/2001 |
| JP | 2002-326233 A | 11/2002 |

* cited by examiner

PRIOR ART

F I G . 12

UNDERCUT PROCESSING MECHANISM

TECHNICAL FIELD

The present invention relates to an undercut processing mechanism which, in a mold for molding an article to be molded having an undercut portion with a stationary mold and a movable mold, brings the undercut portion into a state in which it can be demolded.

BACKGROUND ART

Conventionally, as a molding device of this type, a loose core ejector device disclosed in, for example, Patent Document 1, is known. The loose core ejector device includes a core of a mold for forming an inner surface of an article to be molded; a loose core support rod which is movable, penetrating through this core, and disposed slantwise with respect to the core surface; a guide rod which is locked to a movable mold plate and a pedestal plate; and a slide base which is disposed in the sliding route of the ejector plate so as to be relatively slidable in relation to this guide rod, the loose core support rod being moved in conjunction with the movement of the slide base.

With such a loose core ejector device, one end of the guide rod is locked to a holder which is tightly fitted into a recess formed in the bottom face of the movable mold plate, and the loose core support rod is slidably inserted into an insertion hole which is formed in the core at practically the same inclination angle as that of the guide rod, the insertion hole providing only the element which determines the inclination angle of the loose core support rod.

CITATION LIST

Patent Literature

Patent Document 1: Japanese Unexamined Patent Application Publication No. 2002-326233

SUMMARY OF INVENTION

However, with the conventional technique as described above, not only the loose core support rod, but also the guide rod are disposed slantwise, and yet the mechanism for moving the respective rods at the same inclination angle is configured such that it is distributed in the ejector plate and the movable mold plate. Therefore, as compared to the amount of movement of a piece provided with a geometry corresponding to a part of the undercut portion that is required for demolding of the undercut portion of the molded article, a large installation space is required, and as a whole, the construction becomes complicated, thereby the labor and time required for assembling being much, and the cost reduction being difficult.

In addition, the conventional technique is applicable only to an application where the undercut portion is provided outside the molded article or in a single direction in the inside thereof, and, for example, in such an application where the undercut portion which is projected from the inner portion of the bottom face of the molded article has a geometry which is concaved and convexed in both lateral directions crossing the demolding direction, it has been impossible to perform demolding of the molded article. Therefore, not only the geometry of the undercut portion of a moldable article, but also the location thereof and the number of undercut portions have been limited to an extremely narrow range.

Particularly, the more complicated the geometry of the undercut portion becomes, the larger the movement stroke of the piece which is provided with a geometry corresponding to a part of the undercut portion that is required for demolding will be. In order to solve such a problem, an invention which allows a large movement stroke to be provided in a limited installation space has been demanded.

The present invention has been made in view of the above-described problem which is posed by the conventional technique, and it is an object of the present invention to provide an undercut processing mechanism which can be configured to be compact to meet the demand for space saving, which allows easy machining of and assembling into the mold, which can achieve cost reduction, and particularly which, even in such an application as that where the undercut portion of the molded article has a geometry which is concaved and convexed in both lateral directions crossing the demolding direction, allows a larger movement stroke to be achieved in a limited installation space for easy demolding.

The subject matters of the present invention to achieve the above object are disclosed in the following respective aspects of the present invention:

[1]. An undercut processing mechanism, being provided in a mold for molding an article to be molded having an undercut portion with a stationary mold and a movable mold, bringing the undercut portion into a state allowing demolding it, comprising:
  a holder, being installed inside the stationary mold or the movable mold;
  a pair of mold cores, being housed in the holder for molding the undercut portion, surrounding it from both lateral directions crossing the demolding direction; and
  a retaining piece, being housed in the holder and being movable in the demolding direction,
  basal end portions of the respective mold cores being connected to the retaining piece, respectively, so as to be slidable in both lateral directions leaving from the undercut portion crossing the demolding direction, the respective mold cores being movable between a molding position where they are contacted with each other so as to surround the undercut portion from both lateral directions in the holder, and a mold release position where they are projected outside the holder and mutually separated from the undercut portion,
  in the holder, there being provided a pair of guide means, extending mutually symmetrically, for guiding the respective mold cores along an inclination direction upon a movement of the retaining piece for moving them simultaneously in the demolding direction and either of both lateral directions, respectively, from the molding position to the mold release position,
  the respective mold cores being provided with a geometry allowing at least the respective basal end portions to abut on each other in the back and forth direction with the retaining piece being interposed between them, and upon being moved from the molding position to the mold release position, the respective basal end portions being moved from one end side of the retaining piece to the other end side thereof in the mutually opposite directions so as to pass each other in the back and forth direction.

[2]. The undercut processing mechanism set forth in item [1], wherein either one of an outside wall of one mold core of the respective mold cores, and an inside wall of the holder with which the outside wall of the one mold core is slidingly contacted is provided with a first inclined groove which extends in the inclination direction in which the one mold core is moved, and the other thereof is provided with a first inclined strip which extends in like manner in the inclination direction and slidably fits into the first inclined groove, the first inclined groove or the first inclined strip inside the holder being provided as one of the respective guide means, and either one of an outside wall of the other mold core of the respective mold cores, and an inside wall of the holder with which the outside wall of the other mold core is slidingly contacted is provided with a second inclined groove which extends in the inclination direction in which the other mold core is moved, and the other thereof is provided with a second inclined strip which extends in like manner in the inclination direction and slidably fits into the second inclined groove, the second inclined groove or the second inclined strip inside the holder being provided as the other of the respective guide means.

[3]. The undercut processing mechanism set forth in item [1] or [2], wherein an ejector pin which makes a thrusting-out operation, being driven in the demolding direction, the ejector pin being disposed in a location where the distal end portion thereof faces the inside of the holder, the distal end portion being integrally connected to the retaining piece.

[4]. The undercut processing mechanism set forth in item [1], [2] or [3], wherein the distal end portion of each of the mold cores for molding the undercut portion is removably assembled as a separate part.

[5]. The undercut processing mechanism set forth in item [1], [2], [3] or [4], wherein the respective mold cores are designed to have a length according to the stroke for demolding of the molded article.

[6]. The undercut processing mechanism set forth in item [1], [2], [3], [4] or [5], wherein the holder is configured as a part of the mold that surrounds a hollow portion provided in the movable mold or the stationary mold in which the holder is to be provided.

The present invention functions as follows.

According to the undercut processing mechanism set forth in the above item [1], in the single holder which is installed inside the stationary mold or the movable mold, there are housed the pair of mold cores for molding the undercut portion and the retaining piece for driving the respective mold cores. Here, the holder, the retaining piece, and the respective mold cores can be configured as one unit.

Thus, the respective mold cores can be disposed in either of the stationary mold or the movable mold through the holder without distributing them in an ejector bedplate and the movable mold. Therefore, the undercut processing mechanism can be configured to be compact, meeting the demand for space saving, and allows easy machining of and assembling into the mold to be implemented. Further, the entire construction can be simplified, leading to a substantial reduction in manufacturing cost.

At the time of molding of the article to be molded, the respective mold cores are supported by the retaining piece in the molding position in the holder where they are contacted with each other so as to surround the undercut portion of the article to be molded from both lateral directions. And, at the time of demolding after the molding, with a movement of the retaining piece toward the demolding direction, the respective mold cores, which are connected to the retaining piece, are moved to the mold release position where they are projected outside the holder to be mutually separated from the undercut portion.

At this time, the respective mold cores are moved to the release position, while being guided in the inclination direction by the guide means provided in the holder to be simultaneously moved in the demolding direction and either of both lateral directions, respectively. Here, the guide means corresponding to the respective mold cores separately extend along the mutually symmetrical inclination directions for separating the respective mold cores in both lateral directions.

In addition, with the respective mold cores, the basal end portions thereof are provided with a geometry which allows at least the respective basal end portions to abut on each other in the back and forth direction with the retaining piece being interposed between them, these basal end portions being connected to the retaining piece so as to be slidable in both lateral directions. And, upon the respective mold cores being moved from the molding position to the mold release position, the respective basal end portions are moved from one end side of the retaining piece to the other end side thereof in the mutually opposite directions so as to pass each other in the back and forth direction.

Thereby, regardless of the fact that the respective mold cores can be compactly housed in the holder in such a manner that they are not too much spread out in the lateral direction, a greater movement stroke at the time of demolding can be assured. Therefore, even if the undercut portion which is projected from the inner part of the bottom face of the article to be molded has such a geometry as that which is largely convexed and concaved in both lateral directions crossing the demolding direction, a state in which the undercut portion can be removed with no difficulty is brought about, whereby demolding of the entire molded article can be easily performed.

According to the undercut processing mechanism set forth in the item [2], either one of the outside wall of one mold core, and the inside wall of the holder is provided with the first inclined groove which extends in the inclination direction in which the one mold core is moved, and the other thereof is provided with the first inclined strip which extends in like manner in the inclination direction and slidably fits into the first inclined groove, the first inclined groove or the first inclined strip inside the holder being provided as one of the guide means.

Further, either one of the outside wall of the other mold core, and the inside wall of the holder is provided with the second inclined groove which extends in the inclination direction in which the other mold core is moved, and the other thereof is provided with the second inclined strip which extends in like manner in the inclination direction and slidably fits into the second inclined groove, the second inclined groove or the second inclined strip inside the holder being provided as the other of the guide means.

In this way, the movement of each of the mold cores is positively and smoothly guided on the basis of the fitting relationship between the strip and groove provided for each of themselves and the holder, and the load at the time of demolding is distributed without being concentrated in a single place, whereby the durability is enhanced. In addition, a close tolerance which would be required to be provided at the time of design can be changed into a looser one, whereby a further reduction in cost can be achieved.

According to the undercut processing mechanism set forth in the item [3], the ejector pin is provided which makes the thrusting-out operation, being driven in the demolding direction. This ejector pin is disposed in the location where the distal end portion thereof faces the inside of the holder, the distal end portion being integrally connected to the retaining piece. Accordingly, the retaining piece in the holder can be positively moved in the demolding direction in accordance with the thrusting-out operation of the ejector pin.

According to the undercut processing mechanism set forth in the item [4], the distal end portion of each of the mold cores for molding the undercut portion is removably assembled as a separate part. Therefore, the portion which forms the undercut portion can be replaced from one type to another, thereby the versatility is enhanced.

According to the undercut processing mechanism set forth in the item [5], the respective mold cores are designed to have a length according to the stroke for demolding of the molded article. Thus, any particular stroke from a large one to a small one that is required for demolding the molded article can be accommodated as appropriate.

According to the undercut processing mechanism set forth in the item [6], the holder itself is configured as the movable mold or the stationary mold in which the holder is to be provided. In other words, the hollow portion which can substitute the internal space in the holder may be formed directly in the mold for movably housing the retaining piece and the respective mold cores in this hollow portion. By doing this, the need for the holder as a part is eliminated, resulting in the number of parts being reduced, whereby the configuration of the entire molding device can be further simplified, which leads to further reduction in cost.

With the undercut processing mechanism in accordance with the present invention, even in such an application as that where the undercut portion of the molded article has a geometry which is concaved and convexed in both lateral directions crossing the demolding direction, a larger movement stroke can be achieved in a limited installation space for easy demolding.

And yet, the undercut processing mechanism can be configured to be compact to meet the demand for space saving, allowing easy machining of and assembling into the mold, and having a simple construction, thereby the labor and time required for assembling being minimized, which allows cost reduction to be achieved.

BRIEF DESCRIPTION OF DRAWINGS

FIG. 10 (a)-(b) is an explanatory drawing indicating the movement stroke of the pair of mold cores between the time of molding and the time of demolding in the undercut processing mechanism according to the embodiment of the present invention;

FIG. 11 (a)-(b) is an explanatory drawing indicating the movement stroke of the pair of mold cores between the time of molding and the time of demolding in the conventional undercut processing mechanism.

MODES FOR CARRYING OUT THE INVENTION

Hereinbelow, an embodiment which represents the present invention will be explained with reference to the drawings.

Figure 1:
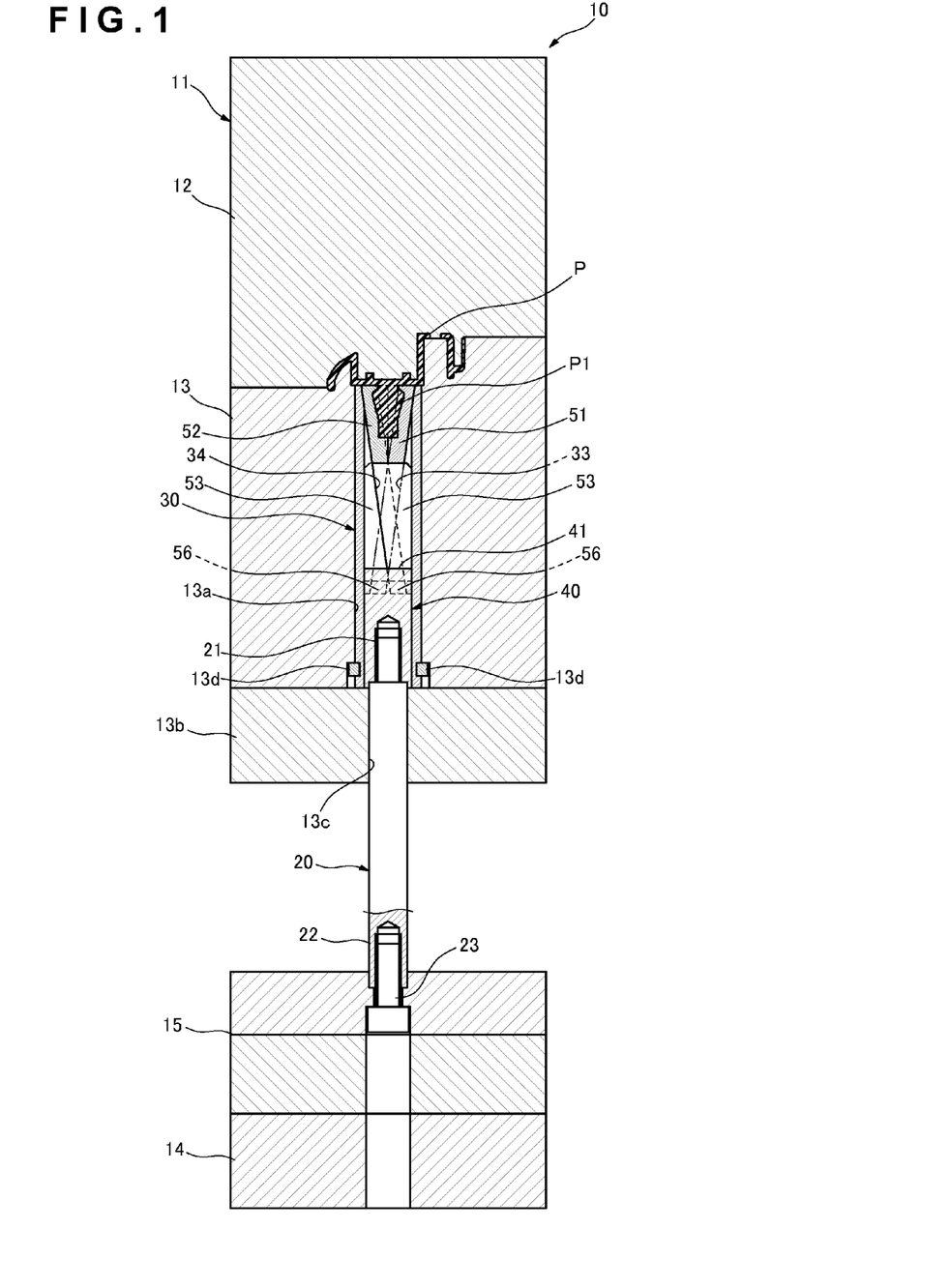
FIG. 1 is a longitudinal sectional view illustrating the state at the time of molding of a mold and an undercut processing mechanism in a molding device according to an embodiment of the present invention.
Figure 2:
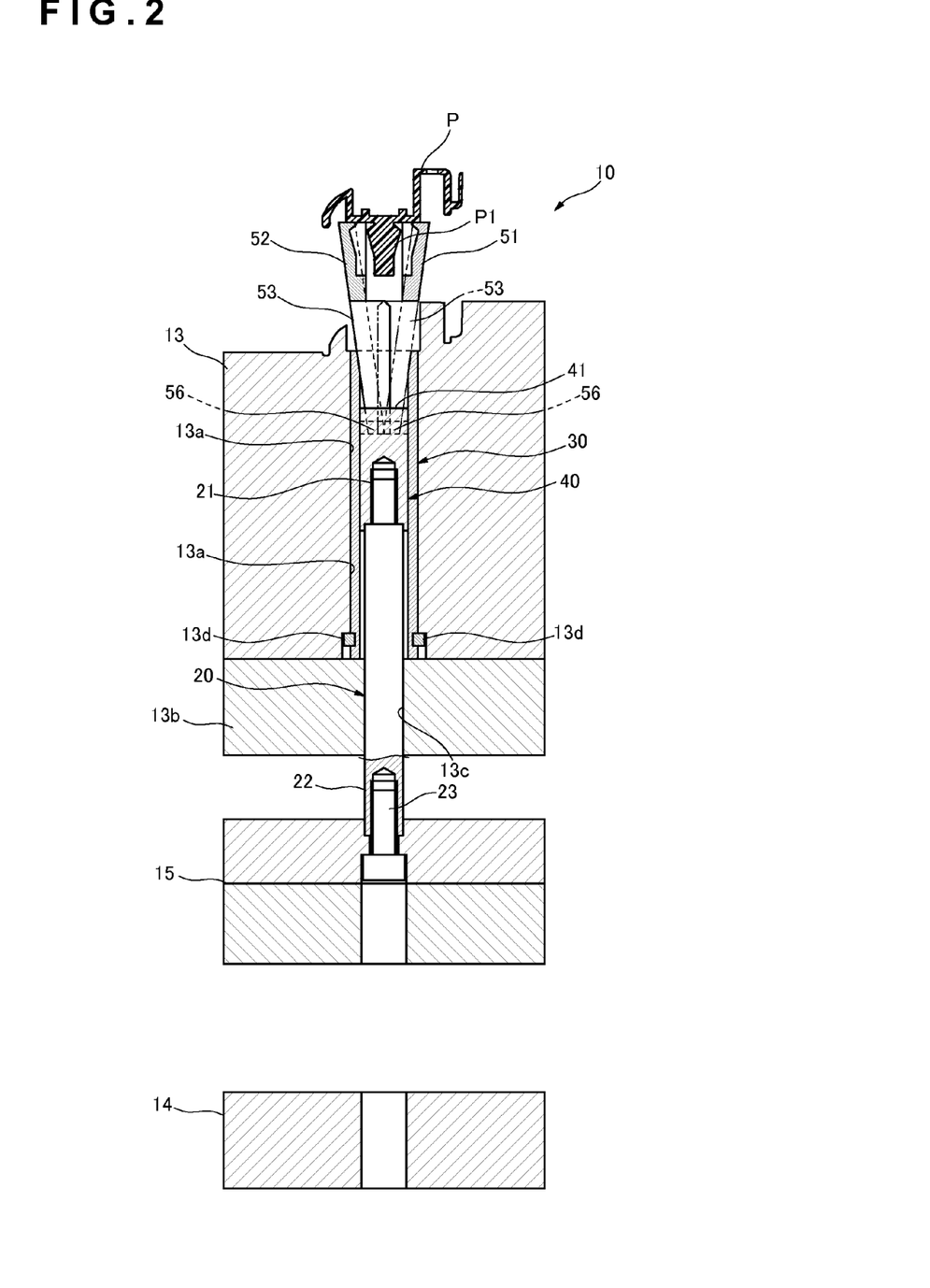
FIG. 2 is a longitudinal sectional view illustrating the state at the time of demolding of the mold and the undercut processing mechanism in the molding device according to the embodiment of the present invention.
Figure 3:
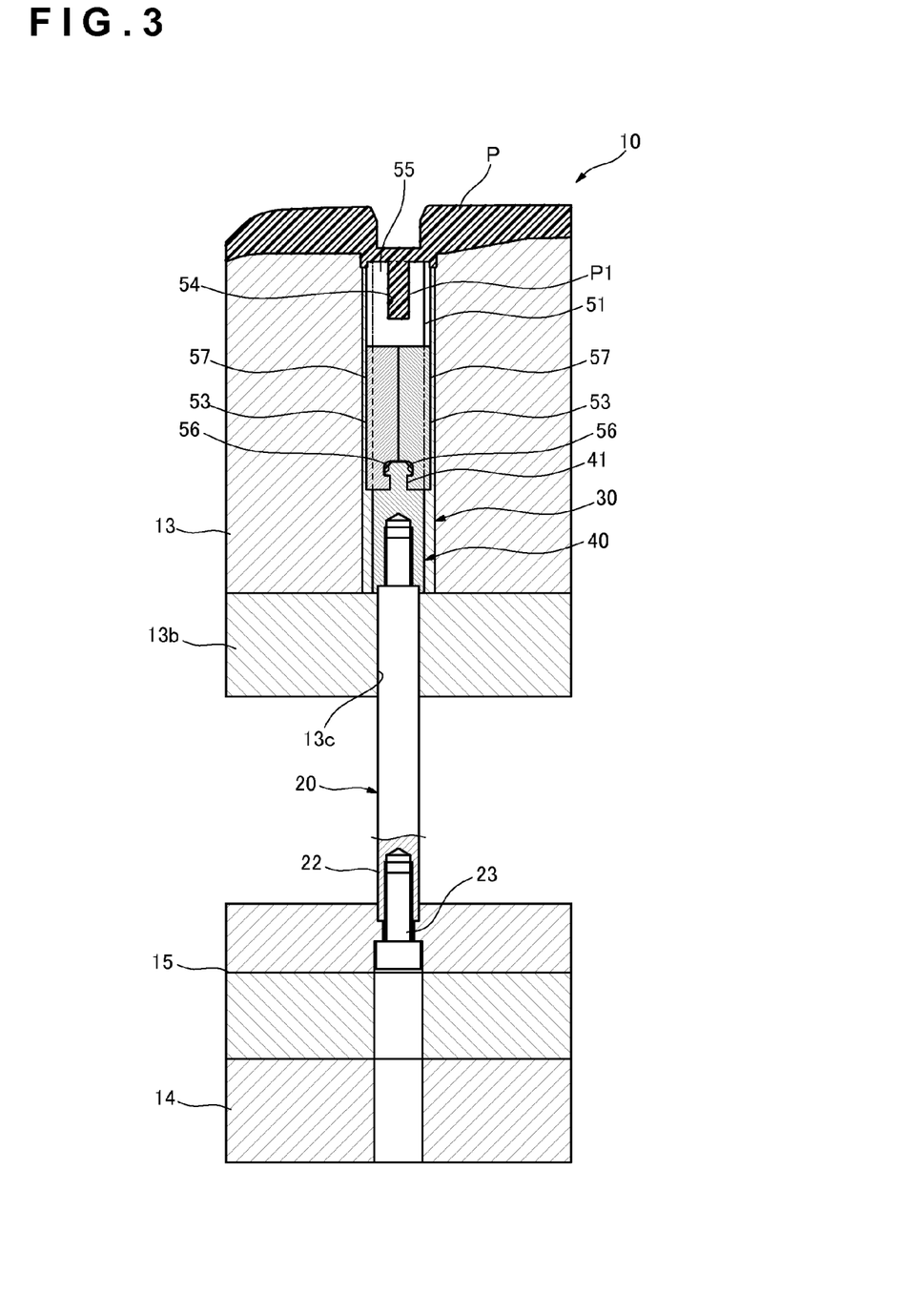
FIG. 3 is a longitudinal sectional view illustrating the state at the time of molding of the mold and the undercut processing mechanism in the molding device according to the embodiment of the present invention when viewed from another direction.

FIG. 1 to FIG. 3 are longitudinal sectional views illustrating operations of a mold 11 and an undercut processing mechanism which constitute a molding device 10 according to the present embodiment. FIG. 1 illustrates the state of an article P to be molded at the time of molding, while FIG. 2 illustrating the state of the molded article P at the time of demolding. In addition, FIG. 3 is a longitudinal sectional view of the article P to be molded when viewed from another direction, i.e., at right angles to the drawing sheet in FIG. 1 illustrating the state at the time of molding.

The molding device 10 is a device for molding the article P to be molded with the mold 11. The article P to be molded according to the present embodiment has a geometry like that of a bumper that extends in a longitudinal direction as a whole as shown in FIG. 12, and FIG. 1 to FIG. 3, and from the inner part of the bottom face thereof, an undercut portion P1 like a clip is provided at predetermined intervals. The undercut portion P1 is hanging and projected from the inner part of the bottom face of the article P to be molded, having a convexed and concaved geometry bulging in both lateral directions. The material for the article P to be molded is not limited to a synthetic resin such as a plastic, and may be a metallic material, such as a ferrous, cuprous, or aluminum one.

As shown in FIG. 1 and FIG. 2, the mold 11 of the molding device 10 is comprised of a stationary mold 12 for molding the portion on the outer surface side of the article P to be molded, and a movable mold 13 for molding the portion on the inner surface side including the undercut portion P1 of the article P to be molded. Further, under the movable mold 13, a movable attachment plate 14 is installed, and between the movable mold 13 and the movable attachment plate 14, an ejector bedplate 15 which is formed of two plate members put one upon another is disposed such that it is drivable in the vertical direction.

The undercut processing mechanism, which provides the heart of the present invention, is an undercut processing mechanism which allows the undercut portion P1 to be released from the mold at the time of demolding the molded article P. Such undercut processing mechanism includes an ejector pin 20 which makes a thrusting-out operation, being driven in the demolding direction; a holder 30 which is installed inside the movable mold 13; a pair of mold cores 51, 52 which are housed in the holder 30 for molding the undercut portion P1 in the state in which they surround it from both lateral directions crossing the demolding direction; and a retaining piece 40 which is also housed in the holder 30, being movable in the demolding direction.

As shown in FIG. 1 and FIG. 2, the ejector pin 20 is formed of a round bar material, being provided to stand vertically on the ejector bedplate 15. The basal end portion 22 of the ejector pin 20 is integrally fixed to the ejector bedplate 15 through a knock pin 23. The ejector pin 20 makes a thrusting-out operation, being driven in the demolding direction, with the ejector bedplate 15 being moved upward. The distal end portion 21 of the ejector pin 20 is disposed in a location where it faces the inside of the holder 30, with the distal end portion 21 being inserted into the holder 30.

The holder 30 is integrally installed inside the movable mold 13. Here, in the movable mold 13, a hollow portion 13a for installing the holder 30 thereinside is previously formed, and the holder 30 is embedded in the hollow portion 13a, being confined with a bottom plate 13b as a separate part. In the bottom plate 13b, a vertical hole 13c through which the ejector pin 20 is passed is provided. On the lower end side of the holder 30, a block 13d for preventing the holder 30 from coming off from the hollow portion 13a is attached.

Figure 4:
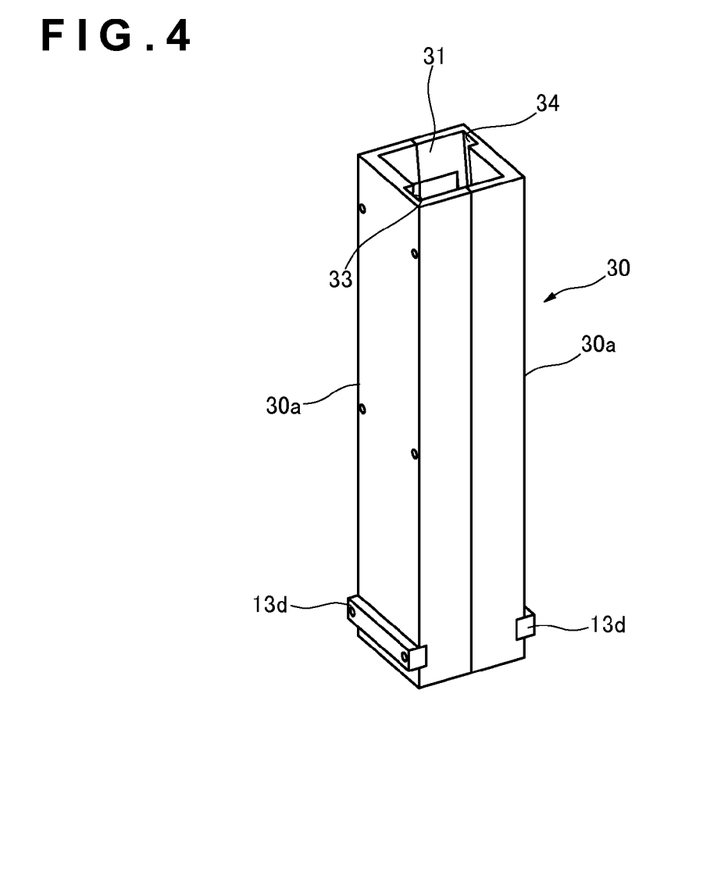
FIG. 4 is a perspective view showing a holder in the undercut processing mechanism according to the embodiment of the present invention.
Figure 5:
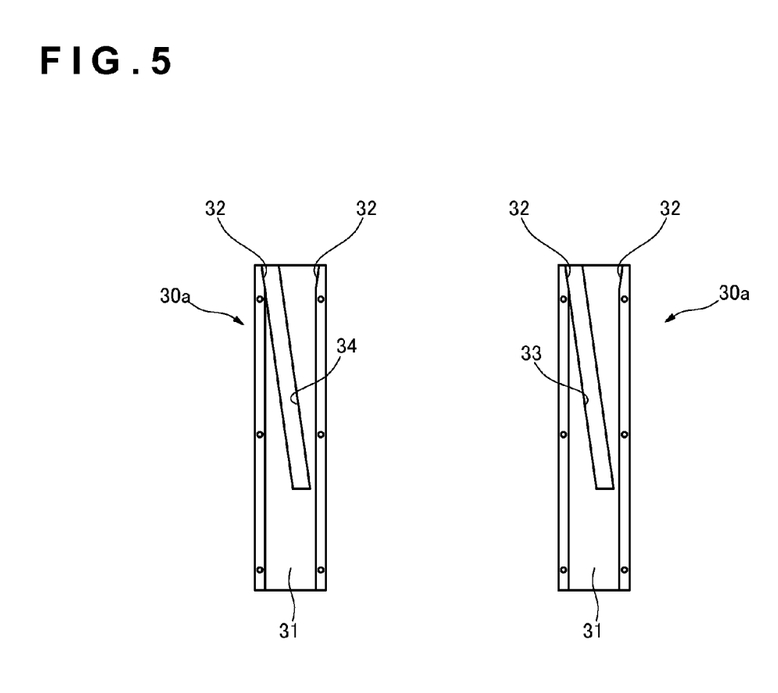
FIG. 5 is a front view showing the inside of two split parts constituting the holder in the undercut processing mechanism according to the embodiment of the present invention.

As shown in FIG. 4 and FIG. 5, the holder 30 is provided as a combination of two split parts 30a having the same geometry, and is formed in the shape of a cylindrical box, having an internal space 31 both of the upper end and the lower end of which are opened. The inside walls on both sides at the upper end opening in the holder 30 are provided with tapers 32 for sliding a later described pair of mold cores 51, 52 diagonally upward, respectively. Further, the inside walls of the split parts 30a are provided with guide means by which the respective mold cores 51, 52 are movably guided, however, these will be later described.

As shown in FIG. 1 and FIG. 2, in the lower portion of the internal space 31 of the holder 30, the distal end portion 21 of the ejector pin 20 is movably inserted, the retaining piece 40 being integrally connected to the distal end portion 21. Here, the retaining piece 40 is housed in the internal space 31 of the holder 30 such that it can be driven in the demolding direction with the ejector pin 20 being moved vertically, and slide between the molding position shown in FIG. 1, and the mold release position shown in FIG. 2.

As shown in FIG. 6 to FIG. 9, the retaining piece 40 is formed of a material in the shape of a rectangular parallelepiped shown in the figures, and on the lower end side thereof, the distal end portion 21 of the ejector pin 20 is directly screwed in (see FIG. 1). On the upper end surface of the retaining piece 40, a projected strip 41 is provided which extends in both lateral directions leaving from the undercut portion P1, crossing, at right angles, the demolding direction, which is the axial direction of the ejector pin 20. To this projected strip 41, the mold cores 51, 52 described below are connected so as to be movable along both respective lateral directions.

As shown in FIG. 6 to FIG. 9, the respective mold cores 51, 52 are formed of a material having the same geometry as shown in the figures, and connected to the retaining piece 40 such that they face each other thereon in a symmetrical manner. More specifically, the mold core 51 has a principal part 53 which extends in the vertical direction, and on the upper end side of the principal part 53, an undercut mold portion 55 having a recess 54 which matches the contour of the undercut portion P1 is integrally formed. This description is also true of the other mold core 52.

With the respective mold cores 51, 52, the basal end portions thereof, in other words, the principal parts 53, excluding the undercut mold portions 55, are provided with a geometry allowing the respective principal parts 53 to abut on each other in the back and forth direction with the retaining piece 40 being interposed between them, the respective inside surfaces being slidably contacted with each other. At the basal end (lower end) of the principal part 53, a recessed groove 56 which is slidably fitted to the projected strip 41 of the retaining piece 40 is provided. Here, the recessed grooves 56 form a dovetail groove with the respective mold cores 51, 52 being joined to each other.

With such a fitting relationship between the recessed grooves 56 of the respective mold cores 51, 52 and the projected strip 41 of the retaining piece 40, the basal end portions of the respective mold cores 51, 52 are connected to the retaining piece 40 so as to be slidable in both lateral directions orthogonally crossing the demolding direction. Here, the respective mold cores 51, are configured to be movable between the molding position (see FIG. 1) where they are opposed to each other in the holder 30 so as to surround the undercut portion P1 from both lateral directions, and the mold release position (see FIG. 2) where they are projected outside the holder 30 so as to be mutually separated from the undercut portion P1.

Figure 8:
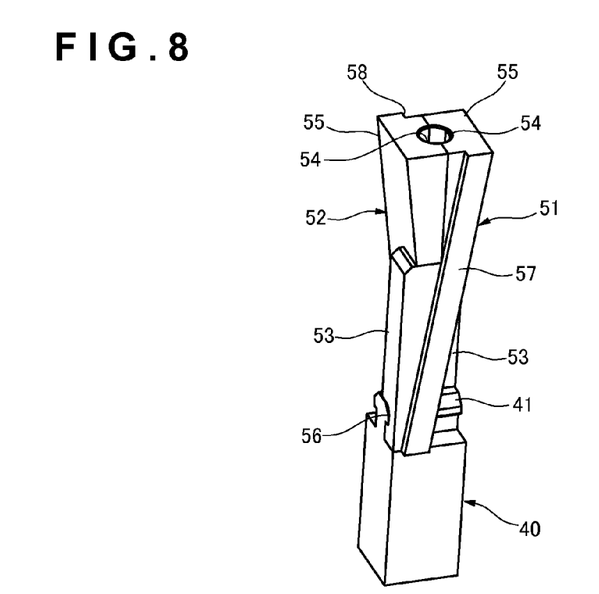
FIG. 8 is a perspective view illustrating the positional relationship between the retaining piece and a pair of mold cores at the time of molding in the undercut processing mechanism according to the embodiment of the present invention.
Figure 9:
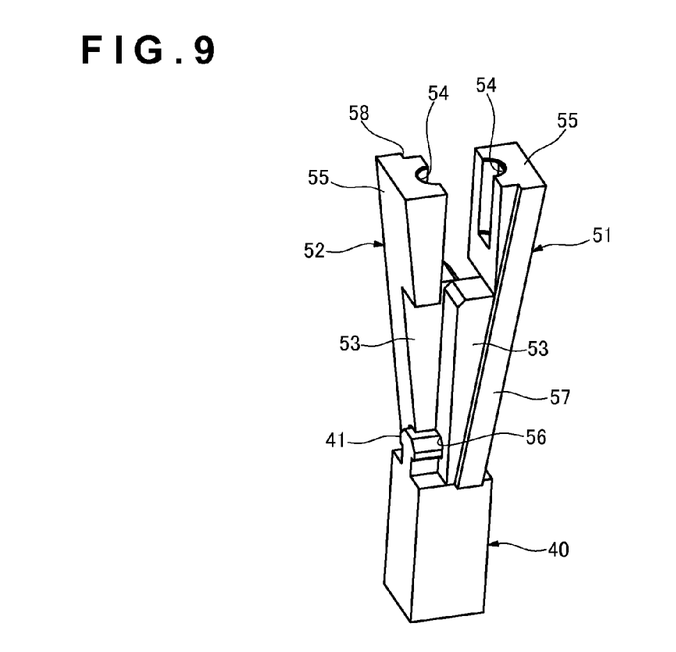
FIG. 9 is a perspective view illustrating the positional relationship between the retaining piece and the pair of mold cores at the time of demolding in the undercut processing mechanism according to the embodiment of the present invention.

As shown in FIG. 8 and FIG. 9, upon the respective mold cores 51, 52 being moved from the molding position to the mold release position, the respective basal end portions are moved from one end side of the projected strip 41 of the retaining piece 40 to the other end side thereof in the mutually opposite directions so as to pass each other in the back and forth direction. In other words, with one mold core 51, the recessed groove 56 provided at the basal end thereof is moved from the left end to the right end on the drawing sheet, while, with the other mold core 52, the recessed groove 56 provided at the basal end thereof is moved reverse from the right end to the left end on the drawing sheet, both intersecting each other on the way.

As shown in FIG. 4 and FIG. 5, in each of the inside walls of the respective split parts 30a of the holder 30, the guide means is provided which, at the time of demolding of the molded article P, guides the respective mold cores 51, 52 along the "inclination direction" for moving them simultaneously in the demolding direction and the direction in either of both respective lateral directions, from the molding position shown in FIG. 1 to the mold release position shown in FIG. 2. Such guide means are constituted by a pair of a first inclined groove 33 and a second inclined groove 34 which are provided in the inside walls of the respective split parts 30a in the sectional shape of recessed grooves, respectively, extending mutually symmetrically. The first inclined groove 33 and the second inclined groove 34 are symmetrical to each other, crossing in the letter of X, when the holder 30 is viewed from the front.

On the other hand, as shown in FIG. 6 to FIG. 9, on the outside wall of the one mold core 51 of the mold cores 51, 52, a first inclined strip 57 is provided as a projection that extends in the inclination direction matching to the first inclined groove 33 of the holder 30, slidably fitting to the first inclined groove 33. The first inclined strip 57 extends straight from the upper end of the undercut mold portion 55 of the mold core 51 to the lower end of the principal part 53. The first inclined strip 57 may be provided for either the outside wall of the mold core 51 or the inside wall of the holder 30, and in such case, the first inclined groove 33 will be provided for whichever is not provided with the first inclined strip 57.

Likewise, on the outside wall of the other mold core 52 of the mold cores 51, 52, a second inclined strip 58 is provided as a projection that extends in the inclination direction matching to the second inclined groove 34 of the holder 30, slidably fitting to the second inclined groove 34. The second inclined strip 58 extends straight from the upper end of the undercut mold portion 55 of the mold core 52 to the lower end of the principal part 53. The second inclined strip 58 may be provided for either the outside wall of the mold core 51 or the inside wall of the holder 30, and in such case, the second inclined groove 34 will be provided for whichever is not provided with the second inclined strip 58.

Next, the function of the present embodiment will be explained.

As shown in FIG. 1 and FIG. 3, at the time of molding the article P to be molded with the molding device 10, the top face of the movable mold 13 of the mold 11 is joined to the bottom face of the stationary mold 12. At this time, in the holder 30 installed inside the movable mold 13, the respective mold cores 51, 52 are supported in the molding position where they are contacted with each other so as to surround the undercut portion P1 of the article P to be molded from both lateral directions. In such a state, the molten material is poured into the cavity of the mold 11, and then cooled to be solidified to provide the molded article P having the undercut portion P1.

Once the article P to be molded has been molded, the stationary mold 12 is disengaged from the movable mold 13, and then as shown in FIG. 2, the ejector bedplate 15 is driven upward. Then, the ejector pin 20 provided to stand on the ejector bedplate 15 is thrusted straight upward, i.e., in the demolding direction, being kept penetrating through the vertical hole 13c on the side of the movable mold 13. In the holder 30, the retaining piece 40 which is supported in the distal end portion 21 of the ejector pin 20 is moved together with the ejector pin 20 in the demolding direction.

With the movement of the retaining piece 40 in the demolding direction, the pair of mold cores 51, 52, the respective basal end portions of which are connected to and supported by the projected strip 41 of the retaining piece 40, are moved from the molding position shown in FIG. 1 to the mold release position shown in FIG. 2, being moved simultaneously in the demolding direction and the direction in both lateral directions, i.e., along the inclination direction. In other words, the respective mold cores 51, 52 are caused to be projected outward the holder 30, while being mutually separated from the undercut portion P1.

In other words, the first inclined strip 57 of the one mold core 51 is slid in the first inclined groove 33 provided in the holder 30, while being guided along one of the symmetrical inclination directions. At the same time, the second inclined strip 58 of the other mold core 52 is slid in the second inclined groove 34 provided in the holder 30, while being guided along the other of the symmetrical inclination directions. The first inclined groove 33 and the second inclined groove 34 extend separately in the symmetrical inclination directions.

In this way, the movements of the respective mold cores 51, 52 in the holder 30 are positively and smoothly guided in the inclination directions on the basis of the fitting relationship between the inclined strips 57, 58 provided on the respective outside walls, and the inclined grooves 33, 34 provided as guide means in the respective inside walls of the holder 30. And yet, the load at the time of demolding the molded article P is distributed without being concentrated in a single place, whereby the durability is enhanced. In addition, a close tolerance which would be required to be provided at the time of design can be changed into a looser one, whereby a further reduction in cost can be achieved.

Further, as shown in FIG. 8 and FIG. 9, with the respective mold cores 51, 52, the principal parts 53 thereof are provided with a geometry which allows the respective principal parts 53 to abut on each other in the back and forth direction with the retaining piece 40 being interposed between them, these principal parts 53 being connected to the retaining piece 40 so as to be slidable in both lateral directions. And, upon the respective mold cores 51, 52 being moved from the molding position to the mold release position, the basal end portions of the respective principal parts 53 are moved from one end side of the retaining piece 40 to the other end side thereof in the mutually opposite directions so as to pass each other in the back and forth direction.

Thereby, regardless of the fact that the respective mold cores 51, 52 can be compactly housed in the holder 30 in such a manner that they are not too much spread out in the lateral direction, a greater movement stroke at the time of demolding can be assured. Therefore, even if the undercut portion P1 which is projected from the inner part of the bottom face of the article P to be molded has such a geometry as that which is largely convexed and concaved in both lateral directions crossing the demolding direction, a state in which the undercut portion P1 can be removed with no difficulty is brought about, whereby demolding of the entire molded article P can be easily performed.

Figure 10:
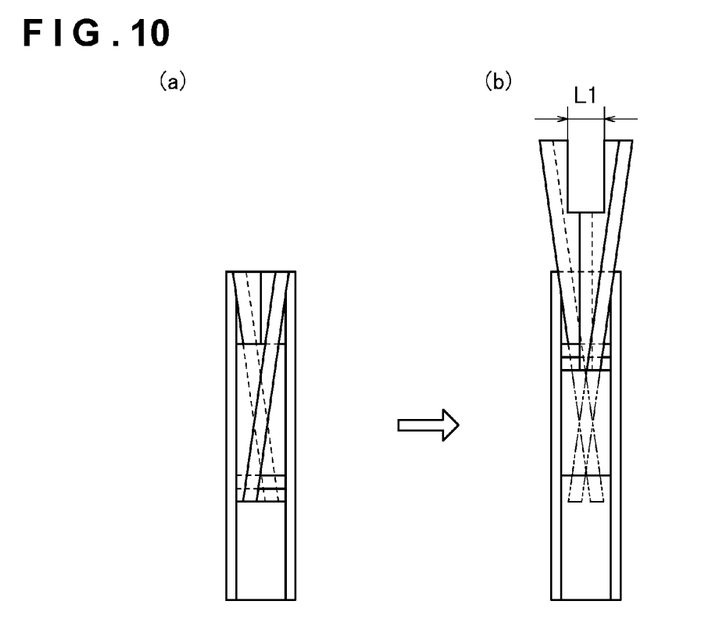
Figure 11:
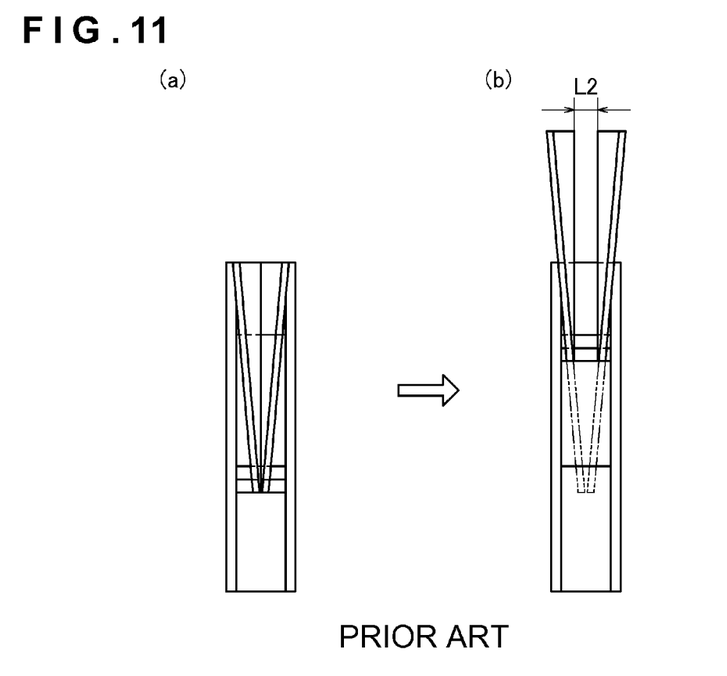
Figure 12:
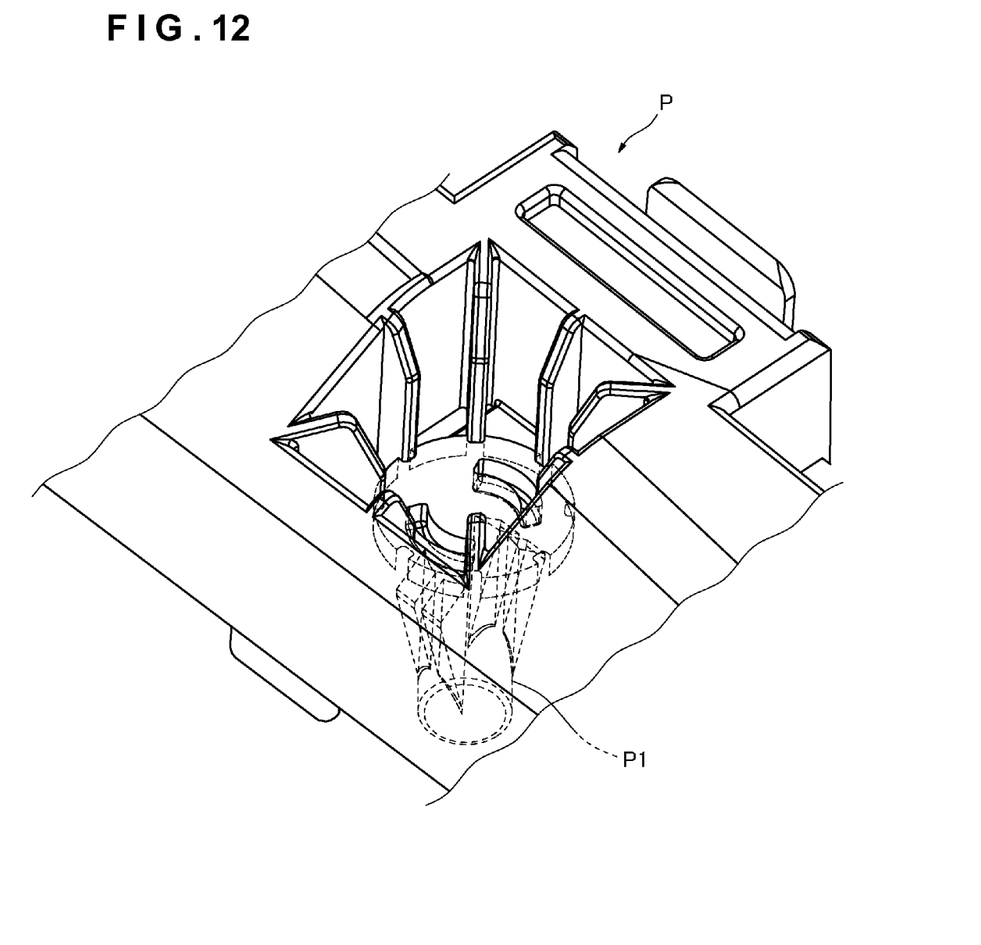
FIG. 12 is an enlarged perspective view showing the critical portion of an article to be molded with the undercut processing mechanism according to the embodiment of the present invention.

Specifically, as shown in FIG. 10, with the molding device 10 according to the present embodiment, the respective mold cores 51, 52 are moved from one end side of the retaining piece 40 to the other end side thereof in the mutually opposite directions so as to pass each other in the back and forth direction. Thereby, the respective mold cores 51, 52 are separated from each other to a great distance L1. On the other hand, as shown in FIG. 11, in the case where the respective mold cores 51, 52 are moved in the mutually opposite directions from the middle of the retaining piece 40 to both ends, the respective mold cores 51, 52 are separated from each other by a small distance L2.

Further, with the undercut processing mechanism according to the present embodiment, the respective mold cores 51, 52 can be disposed only in the movable mold 13 through the holder 30 without being distributed in the ejector bedplate 15 and the movable mold 13. Thereby, the entire molding device 10 can be configured to be compact, whereby the demand for space saving can be met, and machining of and assembling into the mold 11 will be performed easily.

Figure 6:
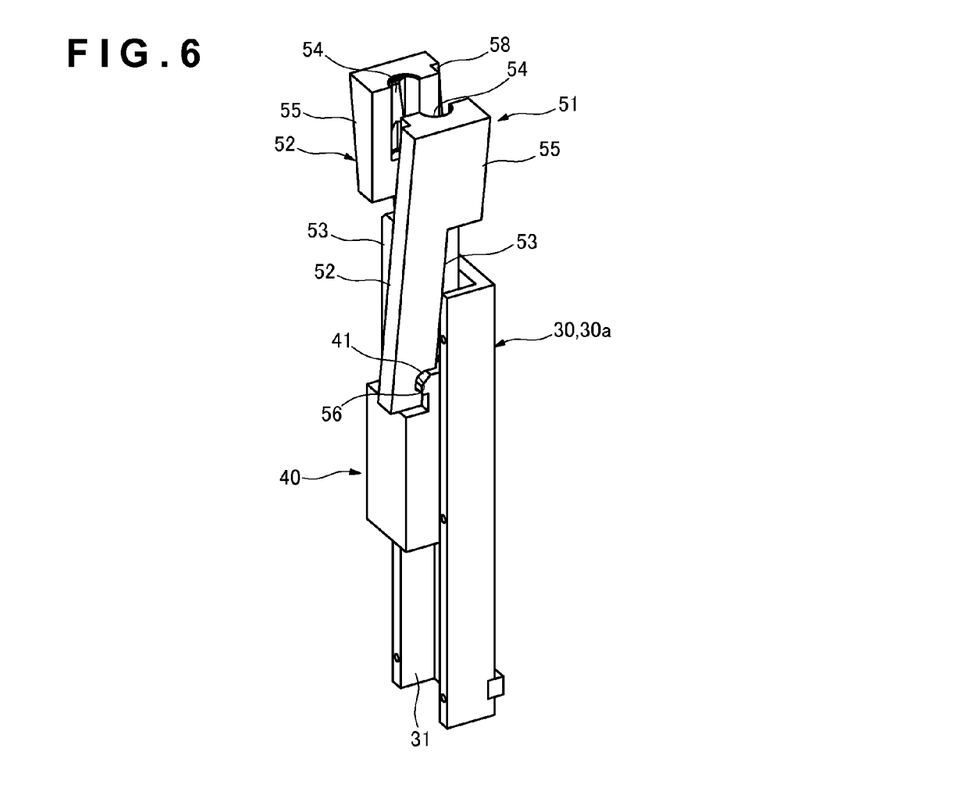
FIG. 6 is a perspective view showing the situation in the holder at the time of demolding according to the embodiment of the undercut processing mechanism of the present invention.
Figure 7:
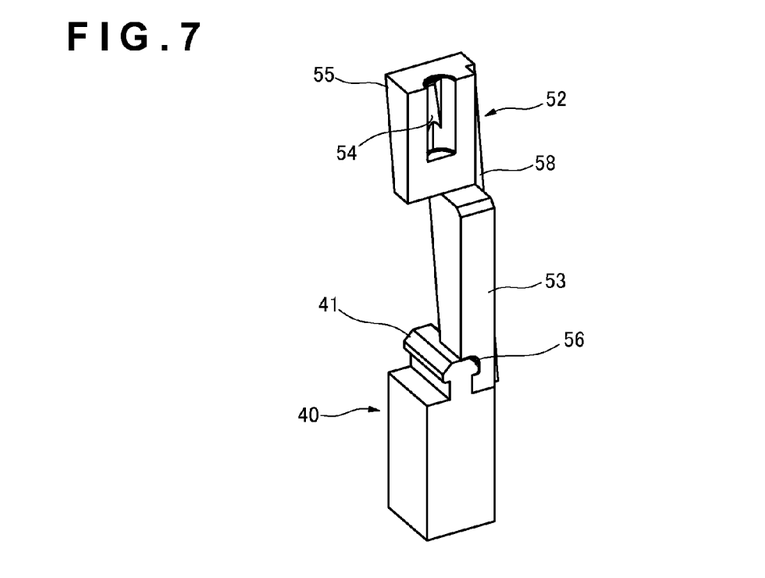
FIG. 7 is a perspective view illustrating the state in which one mold core is mounted to a retaining piece in the undercut processing mechanism according to the embodiment of the present invention.

Particularly, as shown in FIG. 6, the undercut processing mechanism can be configured as a unit in such a manner as that in which the respective mold cores 51, 52 and the retaining piece 40 are previously assembled into the holder 30, and as shown in FIG. 1, can be easily post-assembled into the movable mold 13 through the holder 30. Such a configuration is suitable for an application where the movable mold 13 itself can be easily machined to provide a space for housing the holder 30, as is the case in which the movable mold 13 is small in size.

In FIG. 2, after the molded article P having been drawn off, as the ejector pin 20 is returned to the position at the time of molding, the respective mold cores 51, 52 are also returned to the original position together with the retaining piece 40 with the ejector pin 20 being pulled down. Further, the stationary mold 12 is also returned to the molding position for molding the subsequent article P to be molded. By the way, the respective mold cores 51, 52 are designed to have a length according to the stroke which allows demolding of the entire molded article P including the undercut portion P1. Thus, any particular stroke from a large one to a small one that is required for demolding the molded article can be accommodated as appropriate.

Heretofore, the embodiment of the present invention has been described with reference to the drawings, however, the specific configuration is not limited to that of the above-described embodiment, and various changes and modifications may be included in the present invention, so long as they do not depart from the spirit and scope thereof. For example, the geometry of the molded article P or that of the respective mold cores 51, 52 are not limited to that which is specifically shown in the figures. Further, instead of post-assembling the retaining piece 40 to the ejector pin 20 as a separate part, the retaining piece 40 may be previously provided as an integral part of the ejector pin 20 on the distal end side thereof.

Further, in the above embodiment, the undercut mold portion 55 of each of the mold cores 51, 52 is integrally provided for each of the mold cores 51, 52 on the distal end side thereof, however, the undercut mold portion 55 may be removably assembled to the distal end portion of each of the mold cores 51, 52 as a separate part. By doing this, the undercut portion P1 can be replaced with another type of undercut portion P1, and thus, various types of undercut portion P1 can be accommodated, thereby the versatility is enhanced.

Further, in the above embodiment, the holder 30 is integrally installed inside the movable mold 13, however, it may be integrally installed inside the stationary mold rather than in the movable mold 13. Further, the holder 30 itself may be configured as a part of the movable mold 13 (or stationary mold 12) that surrounds the hollow portion 13a.

In other words, the hollow portion 13a which can substitute an internal space in the holder 30 may be formed directly in the mold 11 for housing the respective mold cores 51, 52, etc. in this hollow portion 13a. By doing this, the number of parts for the holder 30 is reduced, whereby the configuration of the entire molding device 10 can be further simplified, which leads to a reduction in cost.

INDUSTRIAL APPLICABILITY

The undercut processing mechanism allows a compact configuration, being capable of meeting the demand for space saving, and excellent in ease of machining of and assembling into a small-sized mold, and it is particularly suitable for an application where the undercut portion projected from the inner portion of the bottom face of the molded article has a geometry which is convexed and concaved in both rightward and leftward directions crossing the demolding direction.

REFERENCE SIGNS LIST

P: molded article (or article to be molded)
P1: undercut portion
10: molding device
11: mold
12: stationary mold
13: movable mold
13a: hollow portion
13b: bottom plate
13c: vertical hole
13d: block
14: movable attachment plate
15: ejector bedplate
20: ejector pin
21: distal end portion
22: basal end portion
23: knock pin
30: holder
30a: split part
33: first inclined groove
34: second inclined groove
40: retaining piece
41: projected strip
51: mold core
52: mold core
53: principal part
54: recess
55: undercut mold portion
56: recessed groove
57: first inclined strip
58: second inclined strip

The invention claimed is:

1. An undercut processing mechanism, being provided in a mold (11) for molding an article (P) having an undercut portion (P1) with a stationary mold (12) and a movable mold (13), for demolding the undercut portion (P1) from the mold (11) in a demolding direction, comprising:
a single holder (30), being installed inside said stationary mold (12) or said movable mold (13);
a pair of mold cores (51, 52), being housed in said single holder (30) for surrounding the undercut portion (P1) from both lateral directions crossing the demolding direction; and
a retaining piece (40), being housed in said single holder (30) and being movable in the demolding direction,
basal end portions of the mold cores (51, 52) being connected to said retaining piece (40), respectively, so as to be slidable in both lateral directions leaving from the undercut portion (P1) crossing the demolding direction,
the mold cores (51, 52) being movable between a molding position where the mold cores (51, 52) are contacted with each other so as to surround said undercut portion (P1) from the lateral directions in said single holder (30), and a mold release position where the mold cores (51, 52) are projected outside said single holder (30) and separated from said undercut portion (P1),
in said single holder (30), there being provided a pair of guide means (33, 34), extending symmetrically, for guiding the mold cores (51, 52) along an inclination direction upon a movement of said retaining piece (40) so that the mold cores (51, 52) are moved simultaneously in the demolding direction and the lateral directions from the molding position to the mold release position,
the mold cores (51, 52) being formed in a shape so that the basal end portions are overlapped in a back and forth direction with said retaining piece (40) being interposed in between when the mold cores (51, 52) are moved from the molding position to the mold release position, and
the basal end portions being moved from one end side of said retaining piece (40) to the other end side thereof in opposite directions so as to pass each other in the back and forth direction.

2. The undercut processing mechanism according to claim 1, wherein said single holder (30) is provided with a first inclined groove in an inside wall thereof as one of the guide means (33) which extends in said inclination direction,
one of said respective mold cores (51, 52) is provided with a first inclined strip (57) which extends in said inclination direction and slidably fits into said first inclined groove, said single holder (30) is provided with a second inclined groove in the inside wall thereof as the other of the guide means (34) which extends in said inclination direction, and the other of the mold cores (51, 52) is provided with a second inclined strip (58) which extends in said inclination direction and slidably fits into said second inclined groove.

3. The undercut processing mechanism according to claim 1, further comprising an ejector pin (20) to be driven in said demolding direction, said ejector pin (20) having a distal end portion inside said single holder (30), the distal end portion being integrally connected to said retaining piece (40).

4. The undercut processing mechanism according to claim 1, wherein each of the mold cores (51, 52) has a distal end portion for molding said undercut portion (P1), said distal end portion being removably assembled as a separate part.

5. The undercut processing mechanism according to claim 1, wherein the mold cores (51, 52) have a length according to a stroke of demolding said molded article (P).

6. The undercut processing mechanism according to claim 1, wherein said single holder (30) is provided in said movable mold (13).

* * * * *